US009729186B1

(12) United States Patent
Dill

(10) Patent No.: US 9,729,186 B1
(45) Date of Patent: Aug. 8, 2017

(54) MOBILE PHONE HOLDER

(71) Applicant: Allen Dill, Middletown, DE (US)

(72) Inventor: Allen Dill, Middletown, DE (US)

(*) Notice: Subject to any disclaimer, the term of this patent is extended or adjusted under 35 U.S.C. 154(b) by 0 days.

(21) Appl. No.: 15/249,532

(22) Filed: Aug. 29, 2016

(51) Int. Cl.
*H04M 1/00* (2006.01)
*H04B 1/38* (2015.01)
*H04B 1/3888* (2015.01)

(52) U.S. Cl.
CPC ................... *H04B 1/3888* (2013.01)

(58) Field of Classification Search
CPC .......... H04B 1/086; H04B 1/38; H04B 1/385; H04B 1/3833; H04B 1/3888; H04B 2001/3855; H04B 2001/3861; H04M 1/026; H04M 1/03; H04M 1/04
USPC ................ 455/90.3, 575.1, 575.6, 575.8
See application file for complete search history.

(56) References Cited

U.S. PATENT DOCUMENTS

| 6,176,401 | B1 | 1/2001 | Lim |
| 6,665,524 | B1 | 12/2003 | Niemann |
| 6,669,068 | B2* | 12/2003 | Kawakita ............... A45C 13/26 150/108 |
| 6,955,280 | B2* | 10/2005 | Saitoh ................. B60R 11/0241 379/446 |
| 7,810,683 | B2 | 10/2010 | Chan |
| 9,027,808 | B2* | 5/2015 | Kim .......................... A45F 5/00 224/218 |
| 9,306,612 | B2* | 4/2016 | Forsythe ............... H04B 1/3888 |
| 9,456,066 | B2* | 9/2016 | Singhal ................ G06F 1/1626 |
| 2003/0075576 | A1* | 4/2003 | Condiff ..................... A45F 5/02 224/269 |
| 2012/0046083 | A1 | 2/2012 | Klett |
| 2012/0248160 | A1 | 10/2012 | Seimetz |
| 2015/0318885 | A1* | 11/2015 | Earle ..................... H04B 1/385 455/575.6 |

* cited by examiner

*Primary Examiner* — Quochien B Vuong
(74) *Attorney, Agent, or Firm* — Global Intellectual Property Agency, LLC; Daniel Boudwin

(57) ABSTRACT

A mobile phone holder. The mobile phone holder provides a device for securing a cellular communications device to clothes. The holder includes a housing having an open upper end, a rear wall, arcuate side walls, and a bottom end forming a pocket configured to slidably receive and secure a phone in the housing. The sidewalls include cut-out portions and the bottom end includes a slot for providing access to inputs and outputs of a cell phone. A pair of opposing straps are disposed on an exterior surface of the rear wall that are configured to secure the holder to a user's clothing. In this way, a user may attach a cell phone to his or her clothes in order to communicate over the phone without compromising his or her hands.

9 Claims, 5 Drawing Sheets

MOBILE PHONE HOLDER

BACKGROUND OF THE INVENTION

The present invention relates to mobile phone holders. More specifically, the present invention provides a new mobile phone holder for securing the holder to the clothes of a user such that a use may utilize a telephone while performing normal tasks.

The use of a holder for a mobile phone is known in the prior art. More specifically, a holder for a cell phone heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 6,176,401; U.S. Pat. No. 7,810,683; U.S. Pat. No. 6,665,524; U.S. Pat. Pub. No. 2012/0046083; and U.S. Pat. Pub. No. 2012/0248160.

While these devices fulfill their respective, particular objectives and requirements, the aforementioned patents do not disclose a new mobile phone holder. The inventive device includes a housing having an open upper end, a rear wall, arcuate side walls, and a bottom end for forming a pocket configured to slidably receive and secure a phone in the housing. The sidewalls and bottom end include cut-out portions for providing access to inputs and outputs of a cell phone. A pair of opposing straps are disposed on an exterior surface of the rear wall, wherein the straps include clips configured to secure the device to a user's clothes.

In these respects, the mobile phone holder according to the present invention substantially departs from the conventional concepts and designs of the prior art, and in so doing provides an apparatus primarily developed for the purpose of providing a device capable of securely holding a cell phone and attaching it to a user's clothing.

SUMMARY OF THE INVENTION

In view of the foregoing disadvantages inherent in the known types of mobile phone holders now present in the prior art, the present invention provides a new mobile phone holder wherein the same can be utilized for providing convenience for the user when performing tasks while utilizing a phone. The present system comprises a mobile phone holder including a housing having an open upper end, a rear wall having an exterior surface, arcuate sidewalls, each of the arcuate sidewalls having a first portion, a second curved portion, and a third portion, wherein the first portion is integrally connected to the rear wall, wherein the second curved portion is integrally connected to the first portion, wherein the third portion is integrally connected to the second curved portion and parallel relative to the first portion and the rear wall, wherein the first portion, second portion, and third portion form an arch sized to slidably receive a side of a mobile phone, wherein the third portion is parallel relative to the first portion and the rear wall, and cut-out portions disposed on the second curved portions of the arcuate sidewalls, the cut-out portions extending vertically along a linear length of the arcuate sidewalls, a bottom end including a bottom wall having an opening and a front wall, wherein the opening comprises an interior lip disposed around a perimeter thereof, wherein the interior lip is sized to receive a bottom perimeter edge of the mobile phone, wherein the front wall is integrally connected to a bottom end of the third portions of the arcuate sidewalls, thereby forming a front opening, a slot disposed on the front wall, the slot extending horizontally across the front wall, and a pair of opposing straps including a first strap disposed on an upper end of the exterior surface of the rear wall and a second strap disposed on a lower end of the exterior surface of the rear wall, each of the first strap and the second strap comprising a first end and a second end, wherein the first strap extends vertically upwards relative to the rear wall, wherein the second strap extends vertically downwards relative to the rear wall, and a pair of clips each disposed on the seconds end of each of the first strap and the second strap.

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
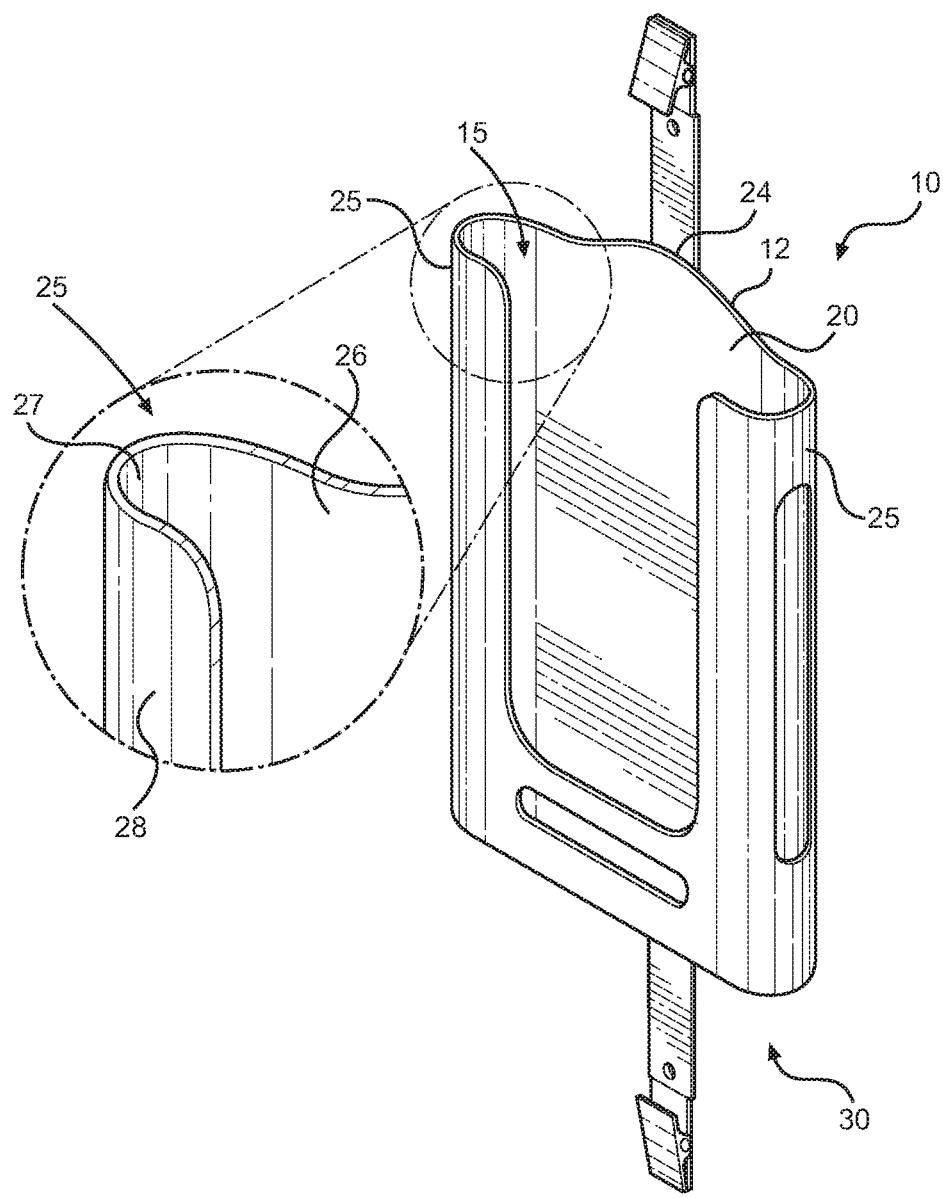
FIG. 1 shows a front perspective view of the mobile phone holder.

Reference is made herein to the attached drawings. Like reference numerals are used throughout the drawings to depict like or similar elements of the mobile phone holder. The figures are intended for representative purposes only and should not be considered to be limiting in any respect.

Referring now to FIG. 1, there is shown a perspective view of the mobile phone holder. The mobile phone holder 10 provides a device configured to slidably receive and retain a mobile phone therein. The holder comprises a housing 12 having an open upper end 15, a rear wall 20, arcuate sidewalls 25, and a bottom end 30. The open upper end 15 is sized to receive a mobile phone therethrough. The rear wall 20 has a planar interior surface against which a mobile phone can rest flush when the mobile phone is positioned within the interior volume of the housing 12. In one embodiment, the rear wall 20 includes a raised central area 24 extending from the upper edge of the rear wall 20. The raised central area 24 provides support to the top end of a mobile phone inserted into the housing 12.

The arcuate sidewalls 25 comprise a first portion 26 integral to the rear wall 20, a curved second portion 27, and a third portion 28. The curved second portion 27 is integrally connected to the first portion 26 and the third portion 28 is integrally connected to the curved second portion 27. The third portion 28 extends horizontally and parallel relative to the first portion 26. The second curved portion 27 forms the arches in the sidewalls. The arches in turn act as guides for slidably receiving and retaining the sides of a mobile phone. When a mobile phone is inserted into the housing 12, the third portions 28 extend over the edges of the mobile phone, thereby securing the phone therein.

Figure 2A:
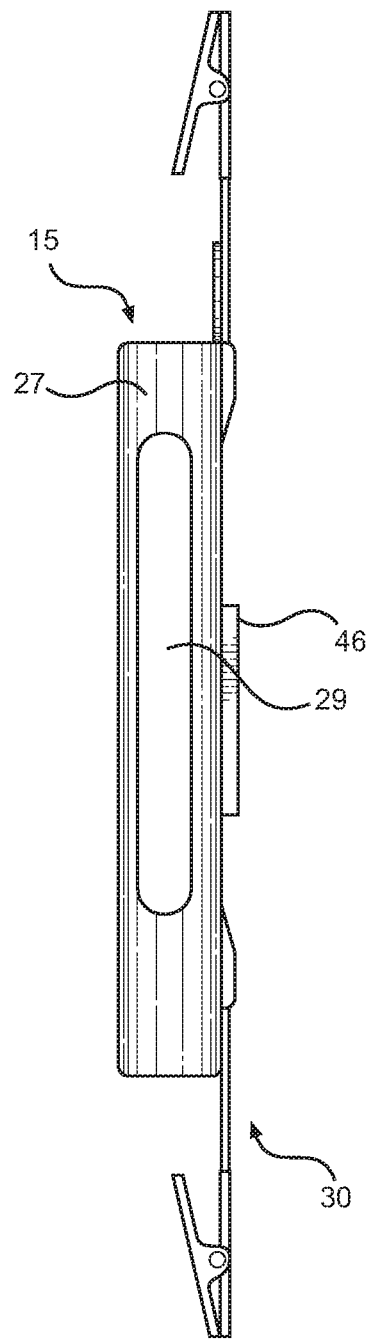
FIG. 2A shows a right side view of the mobile phone holder.
Figure 2B:
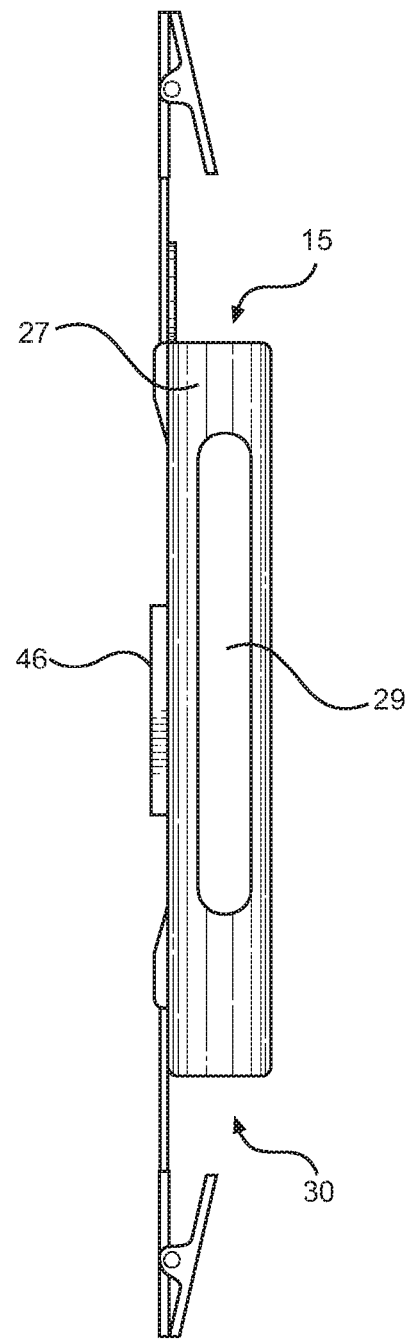
FIG. 2B shows a left side view of the mobile phone holder.

Referring now to FIGS. 2A and 2B, there are shown right and left side views of the mobile phone holder, respectively. Each of the arcuate side walls further comprises an elongated cut-out portion 29 that extends vertically along the linear length of the second curved portion 27. In one embodiment, the cut-out portions 29 are oblong in shape. In alternative embodiments, the cut-out portions 29 are not limited to being oblong in shape, but rather may be circular or rectangular in shape. The cut-out portions 29 are configured to provide access to an input or an output, such as a power button, volume setting, and headphone jack, disposed on a side of a mobile phone. In one embodiment, the cut-out portions 29 are centrally disposed along the length of the second curved portions 27. In other embodiments, the cut-out portions 29 may be disposed adjacent to either of the open upper end 15 or the bottom end 30.

Figure 3:
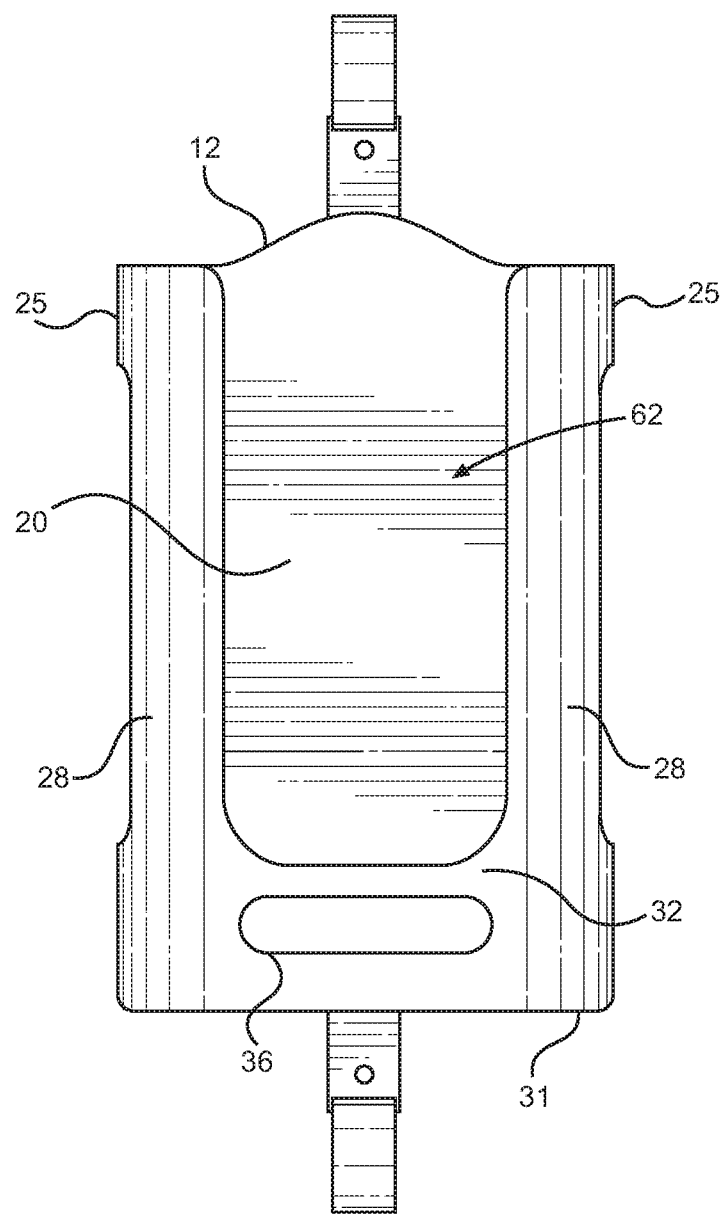
FIG. 3 shows a front view of the mobile phone holder.
Figure 4:
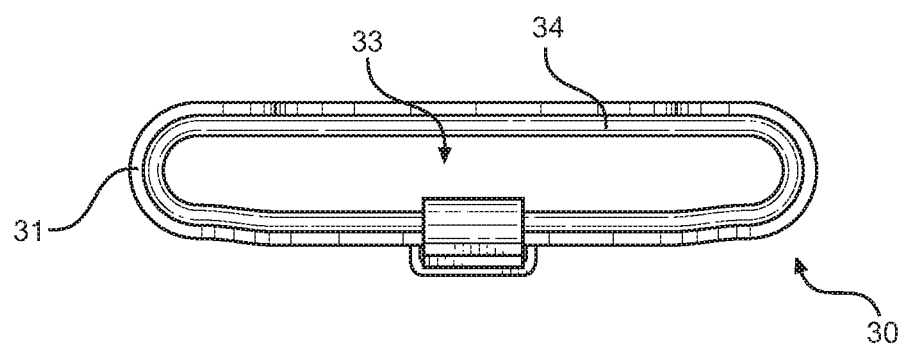
FIG. 4 shows a bottom plan view of the mobile phone holder.

Referring now to FIGS. 3 and 4 there are shown front and bottom plan views of the mobile phone holder, respectively. The bottom end 30 of the housing 12 comprises a bottom wall 31 and a front wall 32. The front wall 32 is integrally connected to a bottom end of the third portion 28 of each of the arcuate sidewalls 25. The front wall 32 extends horizontally and parallel relative to the rear wall 20 and interconnects each of the third portions 28 of the arcuate sidewalls 25. The interconnection in between the front wall 32 and the arcuate sidewalls 25 forms a front opening 62 having a curved perimeter edge. The front opening 62 provides access to a mobile phone's display screen or inputs, thereby enabling a user to utilize their mobile phone without obstruction from the housing 12.

The bottom wall 31 comprises an opening 33 for providing access to an output of a cell phone, such as a speaker. The opening 33 comprises an interior lip 34 disposed around its perimeter. The interior lip 34 is sized and configured to support a bottom perimeter edge of a cell phone such that the cell phone does not slide through the opening 33 of the bottom wall 31 when inserted into the housing 12. The front wall 32 comprises a slot 36 that is sized to provide access to an input disposed on the front of a cell phone, such as a power button, or keyboard, or touchscreen. In one embodiment, the slot 36 is an oblong slot which extends horizontally across the front wall 32. In another embodiment, the slot 36 is centrally disposed on the front wall 32. The front wall 32 is spaced from the rear wall 20, and in conjunction with the lip 34 of the bottom wall 31 and the rear wall 20 forms a pocket configured to receive and retain a mobile phone in the housing 12 after being inserted therein.

Figure 5:
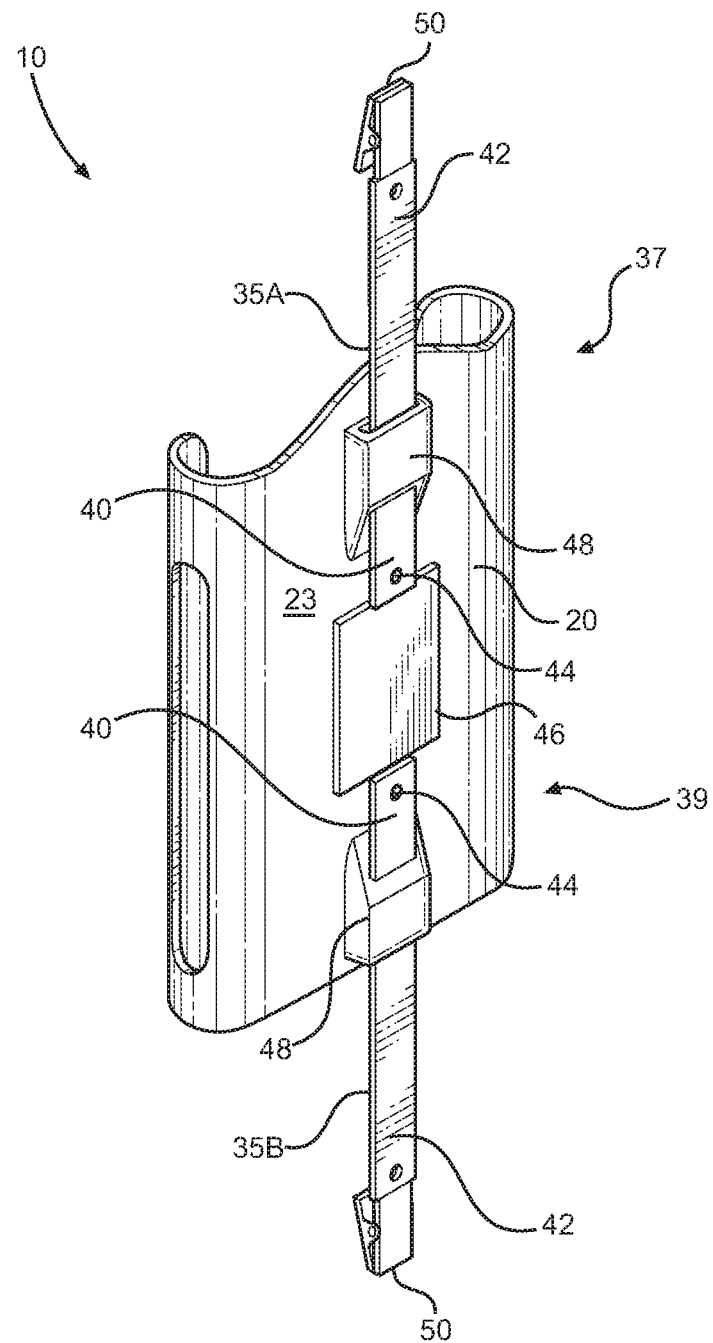
FIG. 5 shows a rear perspective view of the mobile phone holder.

Referring now to FIG. 5 there is shown a rear perspective view of the mobile phone holder. The mobile phone holder 10 further comprises a first strap 35A is disposed on an upper end 37 of the exterior surface 23 of the rear wall 20 and a second strap 35B is disposed on a lower end 39 of the exterior surface 23 of the rear wall 20. The straps 35A, 35B comprise fixed lengths and have widths less than the width of the rear wall 20. In one embodiment, the straps 35A, 35B are constructed of a stretchable synthetic fabric, such as rubber, spandex, vinyl, polyester, or any combination of same. In another embodiment, the straps 35A, 35B are constructed of a stretchable natural fabric, such as wool, cotton, or any combination of same.

The first strap 35A extends vertically upwards from the rear wall 20 and the second strap 35B extends vertically downwards from the rear wall 20. In one embodiment, the straps 35A, 35B are centrally disposed on their respective upper and lower ends 37, 39 and are aligned with one another. Each of the straps 35A, 35B comprises a first end 40 and a second end 42. The first ends 40 are attached to the rear wall 20 via a fastener 44. In the depicted embodiment, the fastener 44 is a pin. In alternative embodiments, the fastener 44 may comprise a screw or a nail. The first ends 40 of the straps 35A, 35B are each threaded through eyelets, which prevent the first ends 40 from pivoting laterally about the fasteners 44. The second ends 42 of the straps 35A, 35B comprise a clip 50 that is configured to clasp onto a user's clothes for the transportation, carrying, and utilization of a cell phone without the use of hands. In one embodiment, the clip 50 comprises an alligator clip.

In an alternative embodiment, the mobile phone holder 10 further comprises a magnetic portion 46 disposed on the exterior surface 23 of the rear wall 20. In the depicted embodiment, the magnetic portion 26 comprises a rectangular metal plate centrally disposed on the rear wall 20 and positioned in between the straps 35A, 35B. In other embodiments, the magnetic portion 26 may be positioned elsewhere on the rear wall 20 and may comprise different shapes and sizes. In yet another embodiment, the magnetic portion 26 is an integrated component of the rear wall 20 and rests flush therein. The magnetic portion 26 is constructed of a ferromagnetic material or a material that is capable of being magnetized, such as iron, nickel, and cobalt. In this way, a user may utilize a magnet positioned on the inside of a pocket to magnetize the magnetic portion 26 and fasten the mobile phone holder 10 to a garment.

In one use, a user utilizes the mobile phone holder 10 to attach a cell phone to his or her clothing while performing various tasks that require constant mobility. First, the user inserts the cell phone in the housing of the mobile phone holder 10. Then, the user utilizes the clip 50 of the first strap 35A to clasp the collar of his or her shirt, t-shirt, sweater, jacket, or other garment. Next, the user utilizes the clip 50 of the second strap 35B to clasp the front of the user's garment. In this way, the user may secure the device to his or her clothing such that he may perform a task at hand, while talking to an individual over the cell phone and without having to compromise his or her hands.

It is therefore submitted that the instant invention has been shown and described in various embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:
1. A holder for a mobile phone, comprising:
   a housing comprising;
      an open upper end;
      a rear wall having an exterior surface;
      arcuate sidewalls, each of the arcuate sidewalls having
         a first portion, a second curved portion, and a third portion;

wherein the first portion is integrally connected to the rear wall;

wherein the second curved portion is integrally connected to the first portion;

wherein the third portion is integrally connected to the second curved portion and parallel relative to the first portion and the rear wall;

wherein the first portion, second portion, and third portion form an arch sized to slidably receive a side of a mobile phone;

wherein the third portion is parallel relative to the first portion and the rear wall;

cut-out portions disposed on the second curved portions of the arcuate sidewalls, the cut-out portions extending vertically along a linear length of the arcuate sidewalls;

a bottom end including a bottom wall having an opening and a front wall;

wherein the opening comprises an interior lip disposed around a perimeter thereof;

wherein the interior lip is sized to receive a bottom perimeter edge of the mobile phone;

wherein the front wall is integrally connected to a bottom end of the third portions of the arcuate sidewalls, thereby forming a front opening;

a slot disposed on the front wall, the slot extending horizontally across the front wall;

a pair of opposing straps including a first strap disposed on an upper end of the exterior surface of the rear wall and a second strap disposed on a lower end of the exterior surface of the rear wall, each of the first strap and the second strap comprising a first end and a second end;

wherein the first strap extends vertically upwards relative to the rear wall;

wherein the second strap extends vertically downwards relative to the rear wall; and a pair of clips each disposed on the seconds end of each of the first strap and the second strap.

2. The mobile phone holder of claim 1, further comprising a magnetic portion disposed on the rear wall, wherein the magnetic portion is constructed of a ferromagnetic material.

3. The mobile phone holder of claim 1, wherein the rear wall comprises a center portion having a raised central area.

4. The mobile phone holder of claim 1, wherein the cut-out portions are elongated and oblong in shape.

5. The mobile phone holder of claim 1, wherein the slot is elongated and oblong in shape.

6. The mobile phone holder of claim 1, wherein the first ends of the first and second straps are attached to the exterior surface of the rear wall via a fastener.

7. The mobile phone holder of claim 6, wherein the fastener is a pin.

8. The mobile phone holder of claim 1, wherein the first strap is centrally disposed on the upper end of the exterior surface of the rear wall and the second strap is centrally disposed on the lower end of the exterior surface of the rear wall such that they are aligned with one another.

9. The mobile phone holder of claim 1, further comprising a first eyelet centrally disposed on the upper end of the exterior surface of the rear wall and a second eyelet centrally disposed on the lower end of the exterior surface of the rear wall such that they are aligned with one another, the first eyelet threadably receiving the first strap therethrough and the second eyelet threadably receiving the second strap therethrough.

* * * * *